United States Patent [19]

O'Halloran

[11] Patent Number: 5,626,807

[45] Date of Patent: May 6, 1997

[54] METHOD FOR MAKING RETAINING WALL MEMBERS

[75] Inventor: Stephen O'Halloran, Middletown, N.Y.

[73] Assignee: Tri-Seal International, Inc., Blauvelt, N.Y.

[21] Appl. No.: 498,817

[22] Filed: Jul. 6, 1995

[51] Int. Cl.⁶ .................................................. B29C 47/90
[52] U.S. Cl. .............. 264/148; 264/177.16; 264/177.19; 264/237; 425/325; 425/379.1
[58] Field of Search ................... 264/177.17, 177.19, 264/177.16, 151, 148, 210.5; 156/237, 244.25, 244.18; 425/325, 379.1, 71, 192 R, 461

[56] References Cited

U.S. PATENT DOCUMENTS

| | | |
|---|---|---|
| 3,538,210 | 11/1970 | Gatto ........................................... 425/71 |
| 3,776,672 | 12/1973 | Heilmayr .................................... 425/325 |
| 4,090,828 | 5/1978 | Renegar ...................................... 425/325 |
| 4,358,221 | 11/1982 | Wickberg . |
| 4,649,008 | 3/1987 | Johnstone et al. ......................... 425/325 |
| 4,685,879 | 8/1987 | Pürstinger et al. ........................ 425/325 |
| 4,863,315 | 9/1989 | Wickberg . |
| 4,874,306 | 10/1989 | Gearhart .................................... 425/192 R |
| 4,913,863 | 4/1990 | Burrafato et al. ........................ 264/177.17 |
| 4,917,543 | 4/1990 | Cole et al. ................................. 405/262 |
| 5,040,927 | 8/1991 | Wickberg . |
| 5,066,353 | 11/1991 | Bourdo ........................................ 264/250 |
| 5,370,758 | 12/1994 | Bourjala et al. .......................... 156/244.18 |
| 5,468,442 | 11/1995 | Brambilla .................................. 264/177.19 |

FOREIGN PATENT DOCUMENTS

| | | | |
|---|---|---|---|
| 53-118467 | 10/1978 | Japan .................. | 264/177.1 |
| 63-162216 | 7/1988 | Japan .................. | 264/151 |
| 5-138712 | 6/1993 | Japan .................. | 425/461 |

*Primary Examiner*—Jeffery R. Thurlow
*Attorney, Agent, or Firm*—Lowe, Price, LeBlanc & Becker

[57] ABSTRACT

A method and apparatus for making U-shaped retaining wall members includes a combination of an extrusion die station, a calibration station, a heavy duty puller such as a tire puller and a travelling saw. The calibration station includes a series of calibration blocks which are spaced apart in an increasing fashion and controllably cooled to subject the extruded product exiting the extruding station to a controlled temperature gradient to prevent thermal shock.

7 Claims, 3 Drawing Sheets

METHOD FOR MAKING RETAINING WALL MEMBERS

FIELD OF THE INVENTION

The present invention is directed to an apparatus and method for making retaining wall members and, in particular, a method and apparatus utilizing a combination of die extrusion and calibration block cooling for retaining wall member manufacture.

BACKGROUND ART

Retaining wall members, such as planks, cross-bars and anchors, bulkheads and the like are well known in the prior art. These retaining wall members are often used to retain the embankments along a roadway or waterway.

Retaining wall members have also found use in the prior art to contain toxic wastes. For example, a toxic waste containment site may be surrounded by retaining wall members to prevent toxic materials from leaching out into the environment.

U.S. Pat. No. 4,863,315 to Wickberg discloses a polymeric retaining wall member having interlocking means along its edges. These interlocking means make the retaining wall member universally mateable with like members so as to form a locked wall.

With reference to FIG. 1, the retaining wall member described in the above-mentioned patent is generally designated by the reference numeral 10 and is seen to include a center section 1 and a pair of outer sections or side walls 3. Each outer section extends upwardly from the center section and forms an obtuse angle therewith.

Each outer section 3 terminates in an interlocking portion 5. The interlocking portion 5 includes a pair of flanged legs 7 and 9. The flanged leg 7 terminates in a T-shaped end 11 with the flanged leg 9 terminating in an L-shaped end 13. As described in the aforementioned patent, the interlocking means 5 permit the wall member 10 to be used in interlocking fashion with other wall members.

The Wickberg patent discloses that an extrusion process can be used to form the retaining wall members. This patent is totally silent as to what type of an extrusion process can be used. In addition, the Wickberg patent offers no guidance concerning what process parameters or variables may be critical in forming the retaining wall members. The inventor is unaware of any prior art technique that has been successfully used to form the Wickberg retaining wall members. Thus, a need has developed to be able to make the retaining wall member of FIG. 1, particularly in an economical and efficient form.

In response to this need, the present invention provides a method and apparatus for the manufacture of the retaining wall member of the type disclosed above. The present invention overcomes the prior art problem of being unable to manufacture the retaining wall member. The invention also makes the retaining wall member to precise dimensions and shape.

SUMMARY OF THE INVENTION

Accordingly, it is a first object of the present invention to provide a method and apparatus for making a retaining wall member having at least a center section and outer sections extending therefrom, the outer sections connected in obtuse angles to the center section.

Another object of the present invention is to provide an improved extrusion method and apparatus which utilizes die extrusion techniques and controlled cooling of the extruded product for retaining wall member manufacture.

A still further object of the present invention is to provide an extrusion method and apparatus which utilizes a plurality of extrusion dies and a plurality of calibration blocks, the calibration blocks controllably heating/cooling the extruded retaining wall member to produce an extruded product having the required dimensions.

Other objects and advantages of the present invention will become apparent as a description thereof proceeds.

In satisfaction of the foregoing objects and advantages, the present invention provides a method of making a U-shaped retaining wall member having an interlocking portion at each free end of the wall by the steps of heating a polymeric material and forcing the polymeric material through a series of heated extrusion die pieces to form an extruded U-shaped retaining wall member. The first extrusion die piece of the series has a U-shaped die orifice with successive extrusion die pieces having increasingly larger orifices. The last extrusion die piece of the series has a die orifice matching the final size of the U-shaped retaining wall member.

The next step in the method is pulling and controllably cooling the extruded U-shaped retaining wall member through a series of calibration blocks to retain the final size of the U-shaped retaining wall member. Each calibration block has an orifice corresponding to the final size of the extruded U-shaped retaining wall member. The calibration blocks are spaced apart with a gradually increasing spacing from the first calibration block to a last calibration block. The U-shaped retaining wall member exiting the calibration blocks is then recovered.

Preferably, the U-shaped retaining wall member includes a center section and a pair of outer sections, each outer section terminating in a U-shaped interlocking portion. The U-shaped interlocking portion includes one flanged leg having a T-shaped end with the other flanged leg having an L-shaped end. Of course, other configurations for the interlocking portion capable of mating with another interlocking portion can be used. For example, one outer section could have a female configuration with the other end having a male section. Alternatively, each outer section of one wall member could have male interlocking portions with the other wall members having female interlocking portions.

To achieve the controlled cooling during travel of the extruded product through the calibration blocks, the calibration blocks are heated and/or cooled to achieve a desired temperature gradient from the first to the last calibration block. By subjecting the extruded U-shaped retaining wall member to this temperature gradient, thermal shock is avoided and the retaining wall member can retain its extruded dimensions.

The inventive apparatus for making the U-shaped retaining wall member having the interlocking portion at each free end comprises an extruder for melting and pumping a polymeric material. A series of heated extrusion dies are positioned downstream of the extruder to receive the pumped material. The first extrusion die of the series has a U-shaped die orifice with successive extrusion dies having increasingly larger U-shaped die orifices. The last extrusion die of the series has a die orifice matching a final size of the U-shaped retaining wall member. Downstream of the extrusion dies is a series of temperature adjustable calibration blocks, each calibration block having an orifice corresponding in size to the final size of the U-shaped retaining wall member exiting the last extrusion die.

Means are provided for adjusting the spacing between adjacent calibration blocks. This adjustable spacing permits formation of a temperature gradient downstream from the extrusion die for avoiding or eliminating a thermal shock to the extruded product. The series of calibration blocks is also adjustably spaced from the extrusion dies.

Means are provided for recovering the retaining wall member exiting the calibration block, the means for recovering preferably including a puller and a travelling saw.

The calibration blocks are preferably ported for temperature adjustability, the ports receiving a heating and/or cooling media for controlled cooling and formation of the desired temperature gradient.

The calibration blocks can be segmented or be of a one piece construction. The blocks can include machined bores therein for cooling/heating or tubing embedded therein to achieve this purpose. Alternatively, said die orifice-containing aluminum plates can be used to control thermal conduction for cooling. The aluminum plates can be combined with forced air cooling provided by an external supply of forced air such as a fan or the like for cooling of the extrusion.

BRIEF DESCRIPTION OF THE DRAWINGS

Reference is now made to the drawings of the invention wherein.

DESCRIPTION OF THE PREFERRED EMBODIMENTS

The inventive method and apparatus permits the manufacture of retaining wall members having interlocking portions on the end thereof in an efficient and accurate manner. Particularly, the calibration blocks downstream of the extrusion die permit precise control over the extrusion's cooling, this control preventing any thermal shock from occurring which could distort the shape of the extrusion and make it useless.

Figure 1:
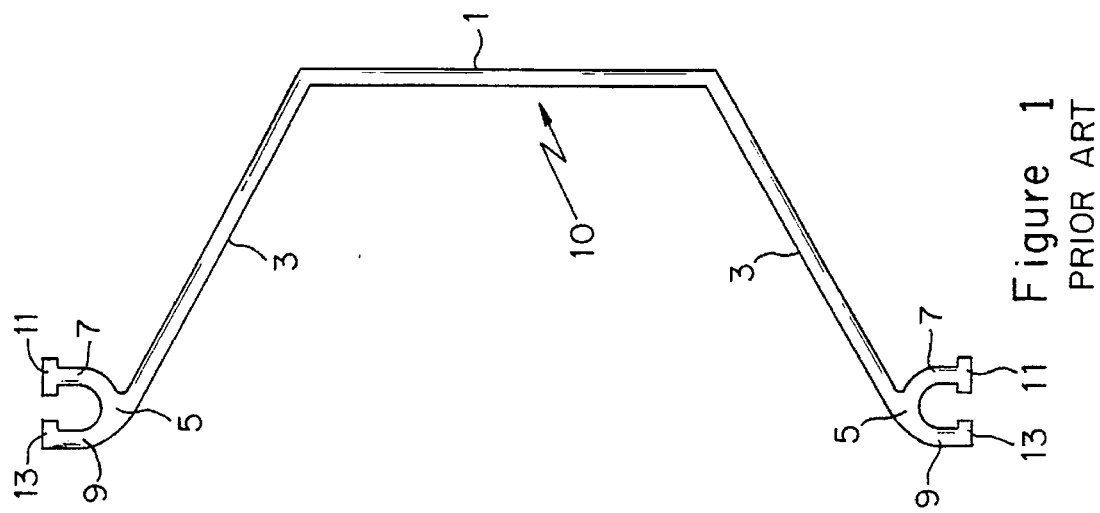
FIG. 1 is an elevational view of a prior art wall retaining member.
Figure 2:
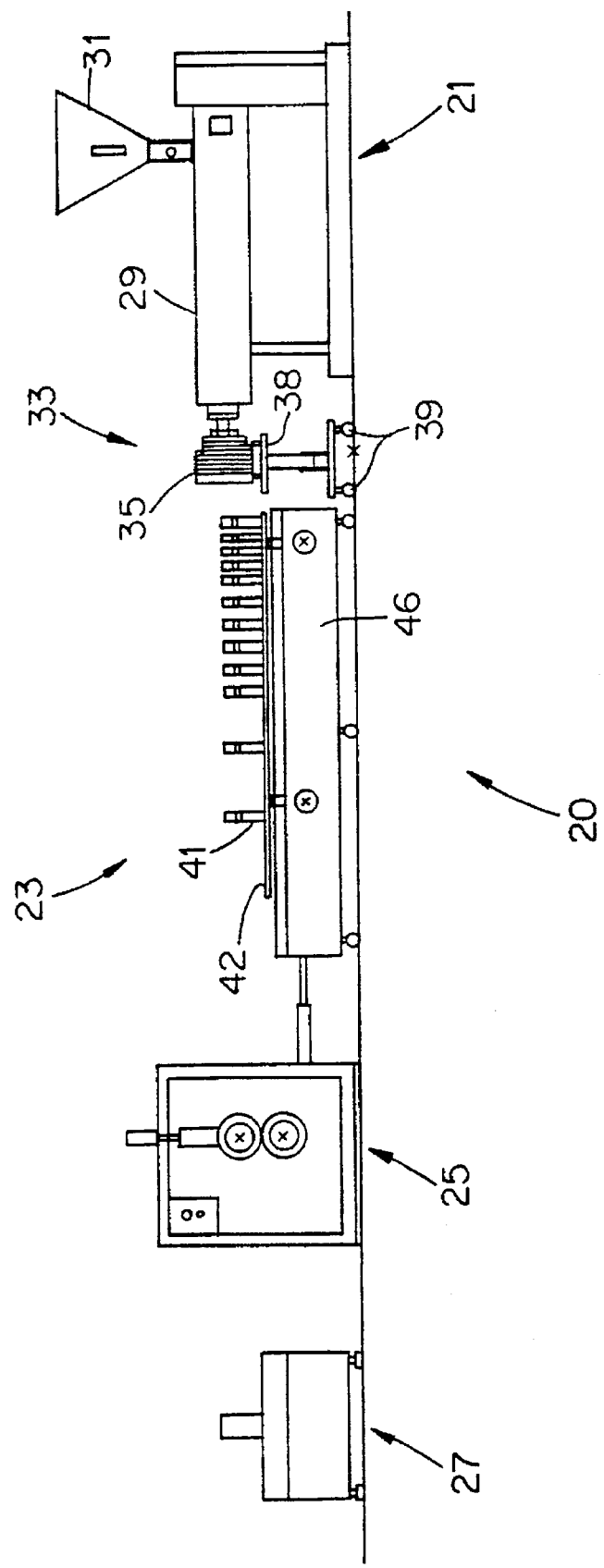
FIG. 2 is a schematic representation of an apparatus for practicing the inventive method.

With reference now to FIG. 2, the inventive apparatus for making the U-shaped retaining wall members depicted in FIG. 1 is generally designated by the reference numeral 20. The apparatus 20 includes an extruder station 21, a calibration station 23, a tire puller 25 and a movable saw 27.

In general, the material, typically a polymer, to be formed into the U-shaped retaining wall member is fed into the extruder station where it is melted and pumped into a die thereof. The extruded material then enters the calibration station for controlled cooling. The tire puller provides the requisite force to pull the extruded retaining wall member and also to feed it to the cutting saw 27. The cutting saw continuously cuts the extruded product into discrete desired lengths.

The term "U-shaped" is intended to encompass any retaining wall member having a center section and a pair of outer sections extending therefrom so long as the outer sections form an angle greater than 90° and less than 180° as measured from the center section.

Figure 3:
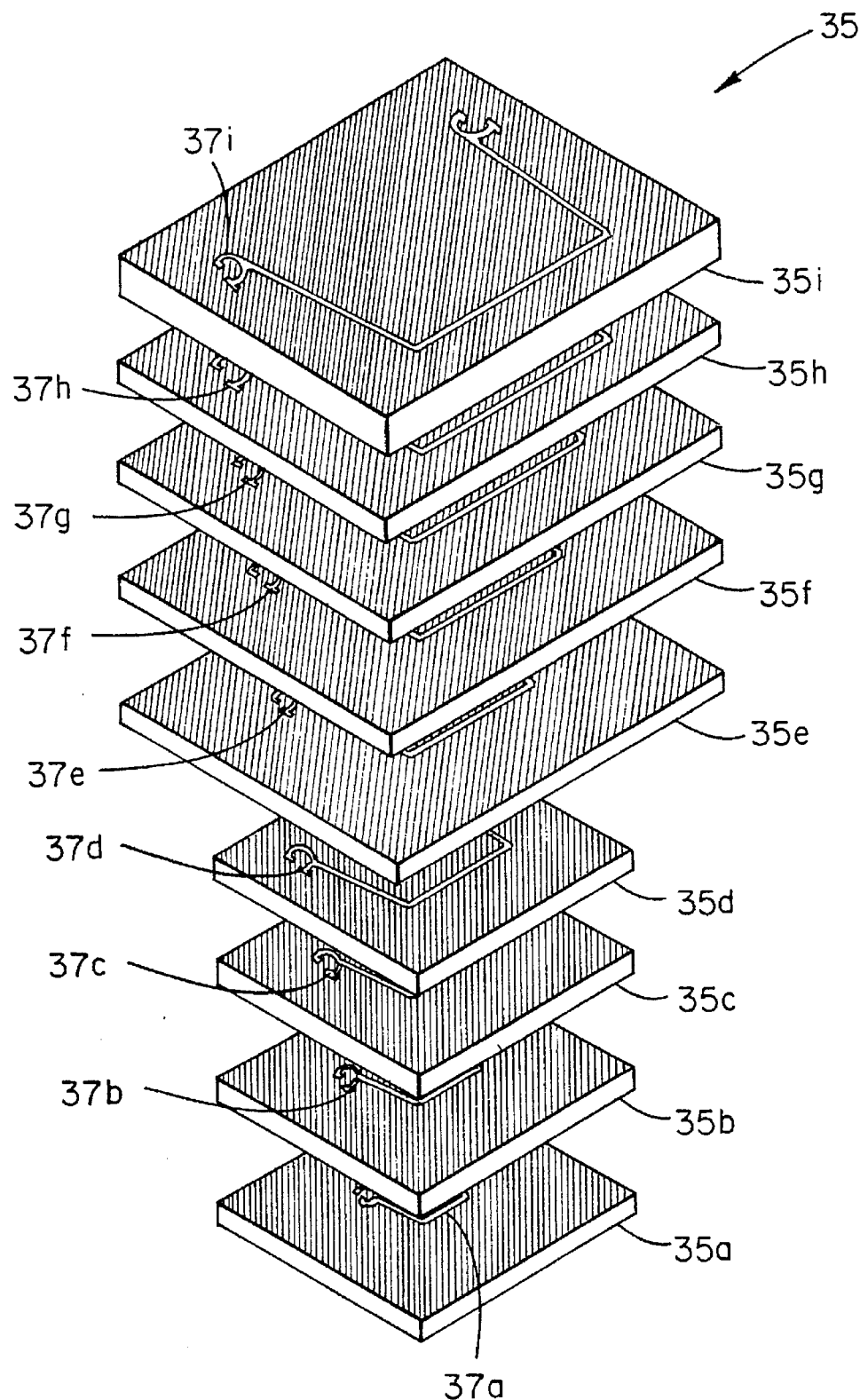
FIG. 3 is a perspective view of the extrusion dies used in the apparatus depicted in FIG. 2.

With reference now to FIGS. 2 and 3, the extruder station 21 further includes an extruder 29 and a receiving material hopper 31. The extruder 29 and hopper 31 are conventional apparatus and require no further discussion for understanding of the convention.

The extruder station 21 also includes an extrusion die assembly 33. The extrusion die assembly 33 includes a series of extrusion die pieces 35 supported on a table or die stand 38 which is movable by the wheels 39. The wheeled table 38 permits adjustment of the spacing between the extruder 29 and the extrusion die pieces 35 as well as between the die pieces and the calibration stage.

The series of extrusion die pieces, i.e. plates, 35 are exemplified in FIG. 3. In this figure, nine plates 35a–35i are depicted. With each plate having an extrusion orifice therein, the successive orifices designated by the reference numerals 37a–37i. The first extrusion die plate 35a has an orifice 37a which is sized smaller than the desired final size. The orifice 37i in the last extrusion die plate 35i is sized to correspond to the final shape of the extruded product.

It should be understood that although nine extrusion die pieces are depicted, this number is only exemplary and more or less than nine extrusion die pieces could be used to extrude the U-shaped retaining wall member.

When using nine extrusion die plates, it is preferred that the first four plates closest to the extruder are 14"×15"×1½" thick. Plates 5 through 8 are 19"×23"×1½" thick. Finally, plate No. 9 is 19"×23"×3" thick. A preferred material for the extrusion die plates is 420 stainless steel.

The die orifices can be formed by any known technique including the use of a wire electrical discharge machine (WEDM).

In a preferred embodiment, the first U-shaped orifice 37a should measure 0.5" upright×2.4" across with a 0.410" flow channel. From the first plate, a transition begins wherein each orifice of a given extrusion die is enlarged from an entry side to an exit side. The degree of enlargement from the entry side to the exit side is approximately and preferably 30° as measured from the horizontal.

The following table details exemplary orifice flow channels measured in linear inches of the U-shaped retaining channel when using the 2.5"×2.4" U-shaped orifice of the first plate mentioned above.

Plate Two:
  Flow Channel Entrance Side. 11.321 Linear Inches
  Exit. 21.136 Linear Inches
Plate Three:
  Flow Channel Entrance Side. 21.136 Linear inches
  Exit. 28.253 Linear Inches
Plate Four:
  Flow Channel Entrance Side. 28.253 Linear Inches
  Exit. 37.212 Linear Inches
Plate Five:
  Flow Channel Entrance Side. 37.212 Linear Inches
  Exit. 47.317 Linear Inches
Plate Six:
  Flow Channel Entrance Side. 47.317 Linear Inches
  Exit. 57.703 Linear Inches
Plate Seven:
  Flow Channel Entrance Side. 57.703 Linear Inches
  Exit. 68.700 Linear Inches
Plate Eight:
  Flow Channel Entrance Side. 68.700 Linear Inches
  Exit. 78.967 Linear Inches
Plate Nine:
  Flow Channel Entrance Side. 78.967 Linear Inches Exit. 88.724 Linear Inches In the extruder station 21, the extrusion die assembly is heated to melt the material to be extruded and facilitate its extrusion. Preferably, the die assembly is heated using sixteen cast aluminum platen heaters, the total voltage being 27,000 volts and 112.5 amps. Of course, any heating means can be used.

Figure 4:
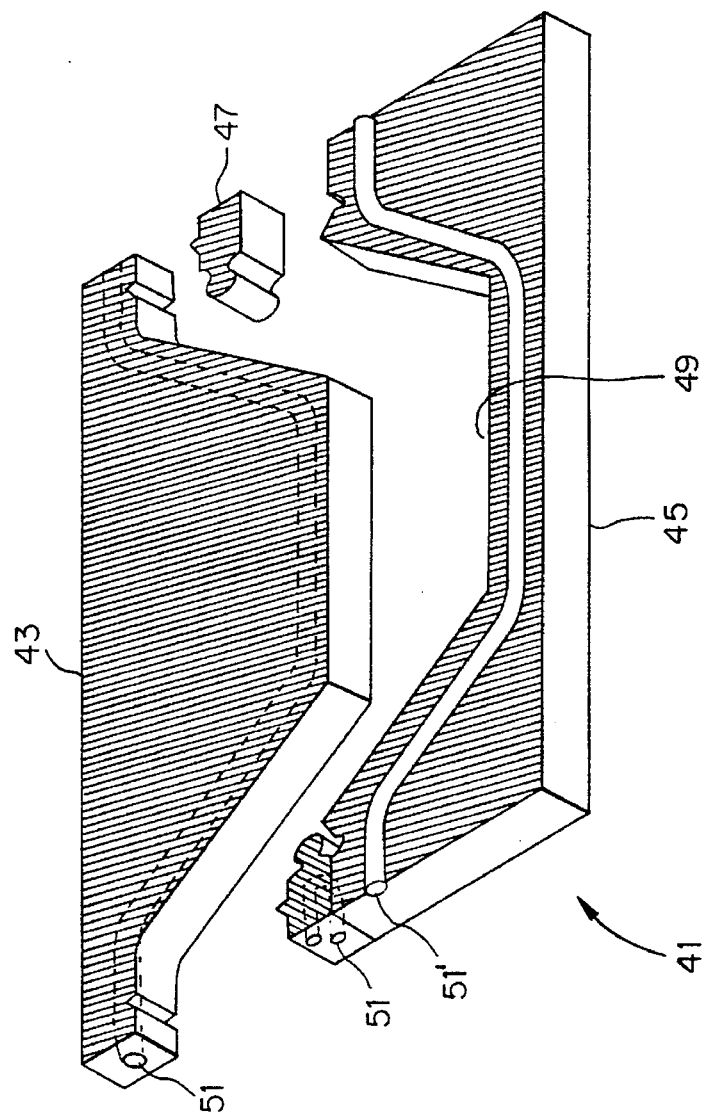
FIG. 4 is a perspective view of one of the calibration blocks depicted in FIG. 2, the calibration block shown in an exploded view for greater detail.

Referring now to FIGS. 2 and 4, the calibration station 23 includes a series of calibration blocks 41 mounted on a table 42. The table 42 is supported by a linear transfer traction device 46 which can adjust the position of table 42 with respect to the extrusion die assembly 33.

The calibration blocks 41 are adjustably positioned on the table with a gradually increasing separation between adjacent calibration blocks, the increasing separation beginning with the block nearest the extrusion assembly 33. Calibration blocks 41 can be mounted on the table 42 anywhere along its length. Once the calibration blocks are mounted, they remain stationary during the extrusion process, only the table 42 moving, if necessary, during extrusion.

With reference to FIG. 4, the calibration blocks are preferably segmented in form, each block 41 having a male segment 43, a female segment 45 and a pair of connecting segments 47.

When the male segment, connector segments and female segment are engaged, a calibration block orifice 49 is formed which corresponds in size to the final extruded product.

It should be understood that the segmented calibration block 41 shown in FIG. 4 is only a preferred embodiment. For example, a single or one piece calibration block could be fabricated with the calibration block orifice 49 formed therein.

It is preferred to provide 12 calibration blocks, each measuring 30" across×14" high×2½ thick. The block can be made of an AA6061 aluminum alloy. Of course, more or less than 12 blocks could be used with varying sizes and orifice dimensions.

In one embodiment, the blocks 41 are ported for cooling and/or heating the extrusion exiting the extrusion die assembly 33. For example, a machined channel or bore 51 extends through the male segment 43. The path of the bore 51 is only exemplary and other configurations may be used. Alternatively, a length of copper tubing 51' could be embedded in the block as shown in the female segment 45 for cooling or heating purposes.

Heated or cooled water could be piped through the bore 51 or tubing 51' for control of the heating/cooling of the extrusion exiting the extruder station 21.

Preferably, when using 12 aluminum blocks, the first six have a length of copper tubing embedded in the block segments to receive high pressure process water for more intense cooling.

Blocks 7–12 will then have a 1"×1" machined channel for low pressure process water. Of course, other heating or cooling media, e.g. gas, could be used in conjunction with the calibration blocks to control cooling of the extruded U-shaped retaining wall member.

An alternative calibration block cooling technique includes the use of aluminum plates which are thinner than the calibration blocks 41 but still have the calibration block orifice therein. The aluminum plates are arranged in a gradually increasing spacing similar to the arrangement shown in FIG. 2. Since the aluminum is a good conductor, arranging a series of plates with increasing separation from the extruder station can effectively cool the extruded retaining wall member without member distortion. If necessary, forced air can be applied over one or more of the plates to increase cooling over a portion or all of the calibration station.

Either the segmented or the one piece calibration block can be manufactured using the WEDM technique referenced above with respect to the extrusion dies.

The spacing of the calibration blocks can vary beginning with an initial spacing between the first two blocks of as low as ½". The spacing can gradually increase up to 24" between the calibration blocks. More preferably, a 2" to 3" spacing is provided between the first two blocks with an 18 to 20 inch spacing between the calibration blocks. The spacings between the first and last blocks would gradually increase from the 2 to 3" spacing up to the final 20" space. Of course, other spacing could be used provided that the spacing between adjacent calibration blocks increases gradually from the first to last block.

Once the U-shaped retaining wall member exits the last calibration block, it is in its final shape approximating an open base trapezoid. Preferably, the center section of the wall member is 12" wide. A distance between the interlocking portions measures about 24" and the open base side is about 9" deep. The thickness of the wall member after being cut is preferably ⅜". The wall member is preferably made using a modified high density polyethylene. Other polymer materials could be used as are known in the art.

In the method aspect of the invention, a polymer material is charged to the hopper 31, fed to the extruder 29, and heated and pumped through the extrusion dies 35. Once the initially extruded wall retaining member passes through the calibration blocks and is engaged by the tire puller, the process can be continuously run.

Once the extruded wall retaining member enters the calibration station, controlled cooling begins to eliminate or greatly reduce any thermal shock to the polymeric material during cooling material. It is well known that plastic materials have a memory factor which may allow them to shrink, twist, turn or otherwise change their shape during cooling. Using the inventive method and apparatus, the calibration station avoids thermal shock by subjecting the extruded retaining wall member to a temperature gradient which slowly cools the extruded wall member from a first temperature entering the calibration station to an exit temperature.

When forming the retaining wall member of a polyethylene, the first calibration blocks are heated such that the extruded wall retaining member entering the calibration station is subjected to about a 200° F. temperature. The temperature gradually reduces over the length of the calibration station by controlling the cooling/heating media used in the calibration blocks. Given a 200° F. temperature in the calibration station, the calibration blocks are controlled such that the temperature goes down to 60° F. over the 12 calibration blocks. This drop in temperature greatly reduces the thermal shock to the polymer material during cooling. Thus, a U-shaped retaining wall member is formed which is consistent in dimension with the dimension of the extrusion dies. Consequently, a U-shaped wall retaining member having highly accurate dimensions is formed which can then be used in forming retaining walls for desired purposes. Since the retaining wall members are accurately shaped, they can be interlocked easily.

It should be understood that calibration blocks can be individually controlled to a desired temperature or controlled in blocks by known control means. For example, the first six calibration blocks could be supplied with high pressure water to achieve the 200° F. beginning temperature in the calibration station. The next six blocks could utilize refrigerated water to bring the extruded product down to the target 60° F. ending temperature.

Once the retaining wall member exits the calibration station, it travels through a puller, preferably a heavy-duty puller and more preferably a tire puller (belt type or multi-wheel type), and into the travelling saw which cuts sections therefrom of a desired thickness.

As such, an invention has been disclosed in terms of preferred embodiments thereof which fulfill each and everyone of the objects of the present invention as set forth hereinabove and provides an improved method and apparatus for making a U-shaped retaining wall member.

Of course, various changes, modifications and alternations from the teachings of the present invention may be contemplated by those skilled in the art without departing from the intended scope thereof. Accordingly, it is intended that the present invention only be limited by the terms of the appended claims.

I claim:

1. A method of making a U-shaped retaining wall member comprising a center section and a pair of outer sections, each outer section forming an obtuse angle with respect to the center section, each outer section terminating in a U-shaped interlocking portion, each said U-shaped interlocking portion including one flange leg having a T-shaped end and another flange leg having an L-shaped end, the T-shaped end positioned between said L-shaped end and said outer section, the method comprising the steps of:

a) heating a polymeric material;
   b) forcing said polymeric material through a sequential series of heated extrusion die pieces to form an extruded U-shaped retaining wall member containing the center and outer sections, a first extrusion die piece of said series having a U-shaped die orifice corresponding in size to a reduced dimension U-shaped retaining wall member and successive extrusion dies progressively increasing in size, a last extrusion die piece of said series having a U-shaped die orifice matching a final size of said extruded U-shaped retaining wall member;
   c) pulling and controllably cooling said extruded U-shaped retaining wall member after it exits the last extrusion die through a successive series of calibration blocks, each calibration block having an orifice corresponding in size to said final size of said extruded U-shaped retaining wall member, said calibration blocks being spaced apart with a gradually increasing spacing from a first calibration block to a last calibration block, wherein at least the first calibration block is heated to a first temperature above ambient temperature and a remainder of the calibration blocks are at a temperature less than the first temperature so that said U-shaped retaining wall member does not distort when passing through the calibration blocks; and
   d) recovering said extruded U-shaped retaining wall member.

2. The method of claim 1, wherein said calibration blocks are cooled by water.

3. The method of claim 1, wherein said calibration blocks are cooled with air.

4. The method of claim 1, wherein said first temperature is about 200° F. and said U-shaped retaining wall member is finally cooled to about 60° F.

5. The method of claim 1, wherein said recovering step further comprises pulling said extruded U-shaped retaining wall member using a tire puller and cutting said U-shaped retaining wall member into defined thicknesses.

6. The method of claim 2, wherein a temperature of said water is controlled during said cooling step.

7. The method of claim 1, wherein said calibration blocks are aluminum and include ports therein for cooling.

* * * * *